(12) United States Patent
Todt

(10) Patent No.: US 6,562,740 B1
(45) Date of Patent: May 13, 2003

(54) MATERIAL FOR PROTECTING ARTICLES HAVING A NONWOVEN FABRIC BONDED TO A SHRINK FILM BY AN ADHESIVE APPLIED TO THE FILM IN A PRE-DETERMINED PATTERN

(75) Inventor: Gregory L. Todt, Union, MI (US)

(73) Assignee: Transhield Technology AS, Oslo (NO)

( * ) Notice: Subject to any disclaimer, the term of this patent is extended or adjusted under 35 U.S.C. 154(b) by 115 days.

(21) Appl. No.: 09/664,896

(22) Filed: Sep. 19, 2000

(51) Int. Cl.[7] .................. B32B 27/04; B32B 27/12; B32B 5/02
(52) U.S. Cl. ............... 442/149; 442/394; 442/408; 428/34.9; 428/198; 428/311.1
(58) Field of Search ................. 442/394, 408, 442/149; 428/198, 34.9, 311.1

(56) References Cited

U.S. PATENT DOCUMENTS

| | | |
|---|---|---|
| 3,017,729 A | 1/1962 | Cheeley |
| 3,653,497 A | 4/1972 | Hornstein |
| 3,694,995 A | 10/1972 | McKinney |
| 3,809,223 A | 5/1974 | Kendall |
| 4,247,509 A | 1/1981 | Talbot |
| 4,725,473 A | 2/1988 | Van Gompel |
| 4,748,070 A | 5/1988 | Beehler |
| 4,763,783 A | 8/1988 | Talbot |
| 4,821,785 A | 4/1989 | Rolan |
| 4,891,249 A | 1/1990 | McIntyre |
| 4,938,522 A | 7/1990 | Herron et al. |
| 5,029,933 A | 7/1991 | Gillem |
| 5,149,578 A | 9/1992 | Wheatley et al. |
| 5,342,469 A | 8/1994 | Bodford et al. |
| 5,491,017 A * | 2/1996 | Todt ........................... 156/290 |
| 5,536,555 A * | 7/1996 | Zelazoski et al. ........... 128/849 |

FOREIGN PATENT DOCUMENTS

| | | |
|---|---|---|
| GB | 1194706 | 6/1970 |
| JP | 52-27595 | 7/1977 |
| JP | 56 84778 | 7/1981 |
| JP | 60 198239 | 10/1985 |
| JP | 62 85940 | 4/1987 |
| JP | 2 192941 | 7/1990 |
| JP | 4 215924 | 8/1992 |

* cited by examiner

Primary Examiner—Terrel Morris
Assistant Examiner—Norca L. Torres
(74) Attorney, Agent, or Firm—Harness, Dickey & Pierce, P.L.C.

(57) ABSTRACT

A shrinkable protective material includes a non-woven fabric bonded to a shrinkable film by an adhesive that is applied to the film in a pre-determined pattern. Upon shrinking, the non-woven fabric separates or releases from the film and forms cushions or pillows holding the film off of the surface being protected. The edge portions of the cushions or pillows act as shock absorbers and deflect over the bonds, thus protecting the surface against the abrasive bonded portions of the non-woven fabric.

13 Claims, 4 Drawing Sheets

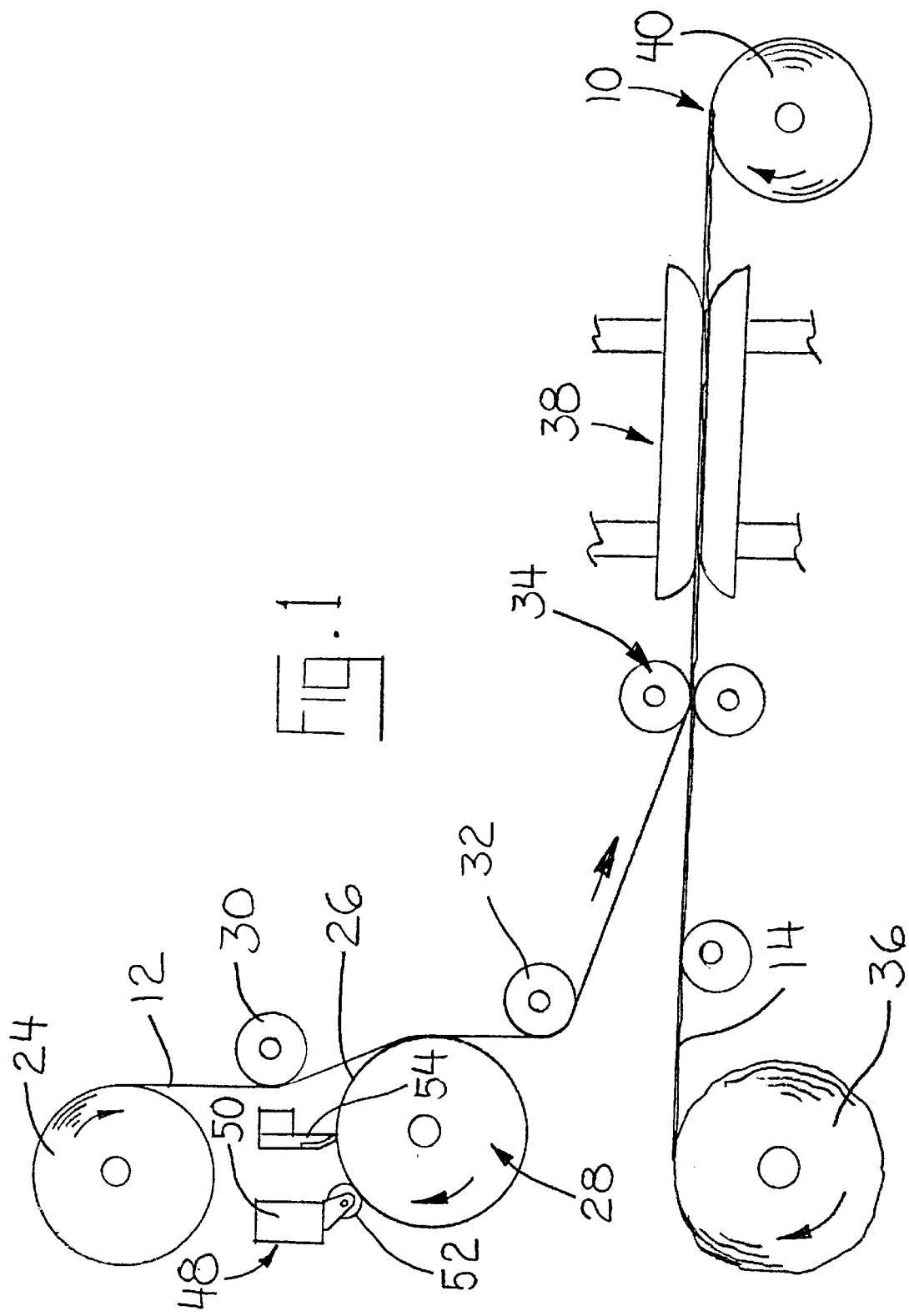

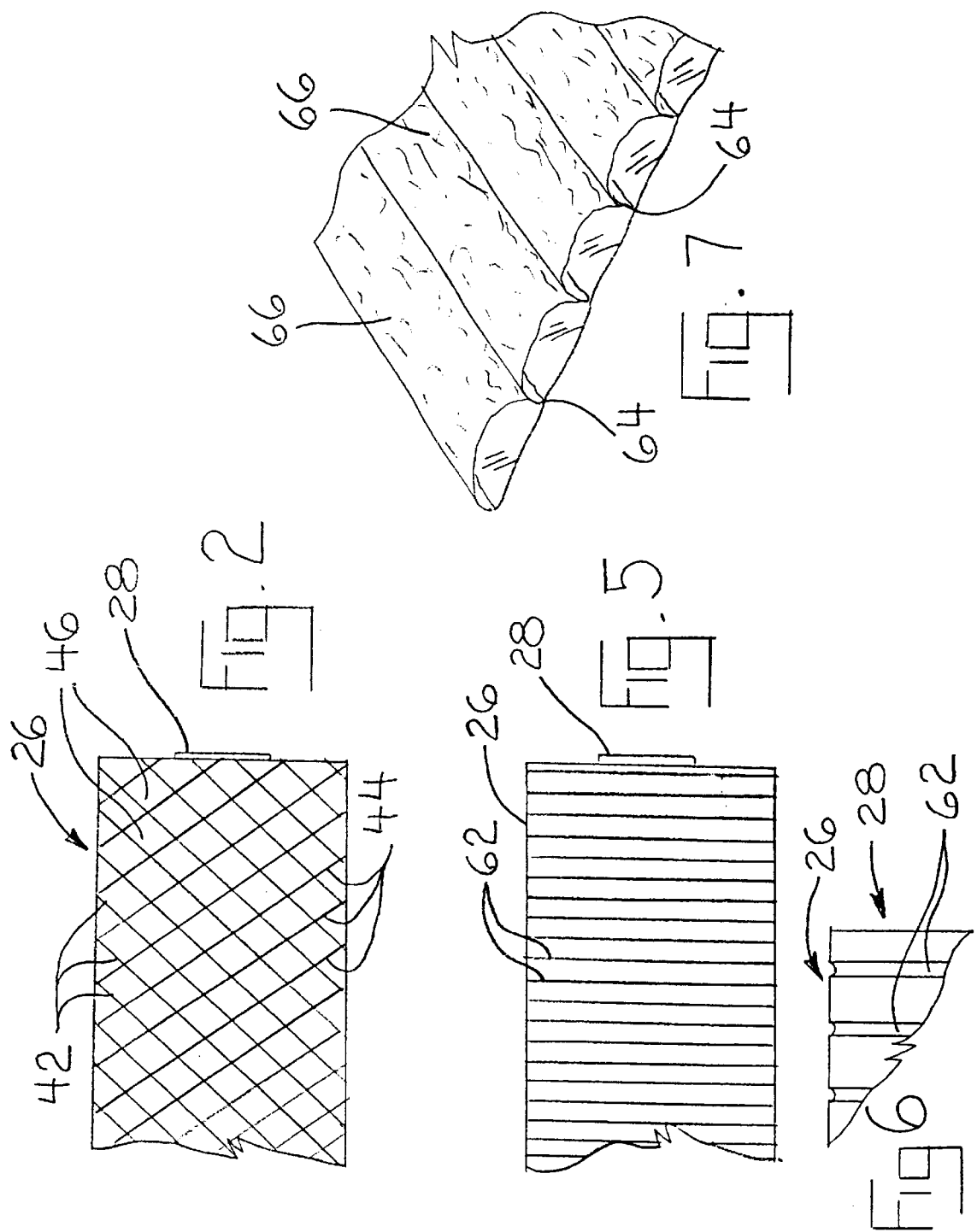

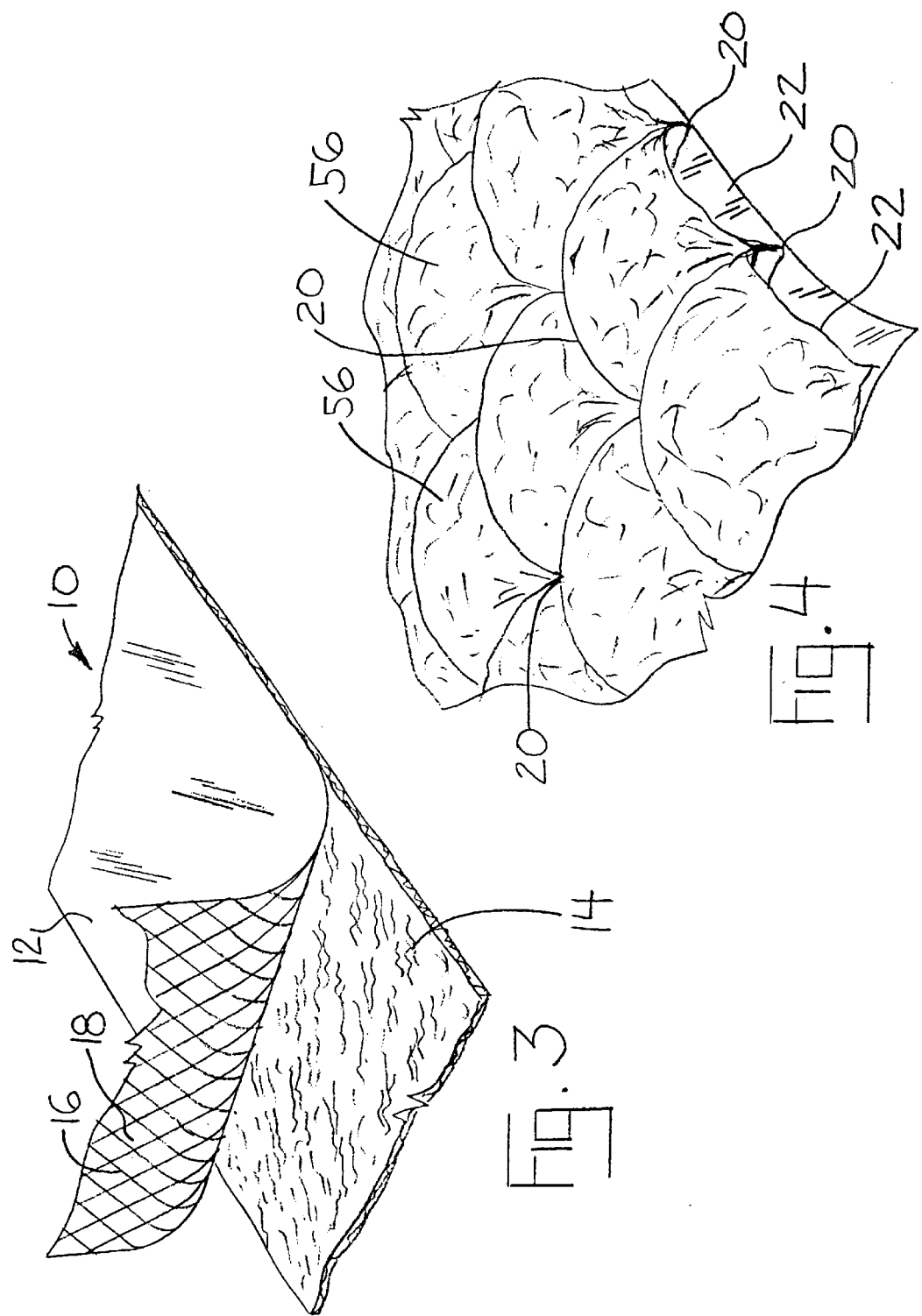

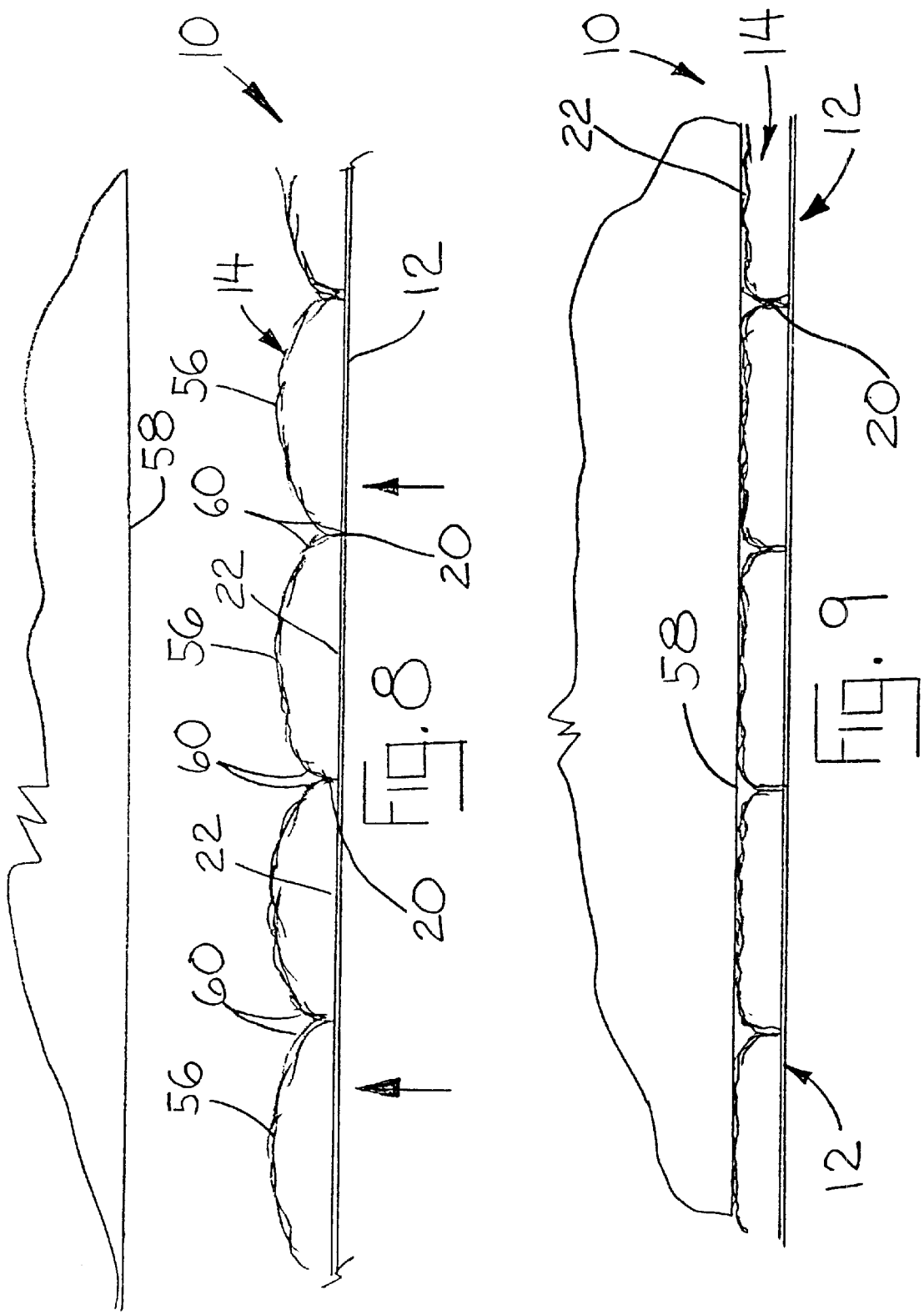

US 6,562,740 B1

MATERIAL FOR PROTECTING ARTICLES HAVING A NONWOVEN FABRIC BONDED TO A SHRINK FILM BY AN ADHESIVE APPLIED TO THE FILM IN A PRE-DETERMINED PATTERN

TECHNICAL FIELD

This invention relates to a material for protecting articles during transport and storage, a method of manufacturing the material, and a method of using the material to protect articles.

BACKGROUND OF THE INVENTION

Large articles, such as automobiles, machinery and boats must often be transported from the factory to the ultimate consumer on open trucks where they are exposed to the environment. Consumers expect that new automobiles, boats and machinery to be in pristine condition, and will not tolerate defects. As discussed in prior U.S. Pat. No. 5,491,017, damage may be caused by a number of factors, including acid rain and hurled objects, such a small rocks and stones. The wrap material disclosed in U.S. Pat. No. 5,491,017 includes a non-woven fabric intermittently bonded to a shrinkable and stretchable film that has a pre-determined shrink response as heat is applied thereto. The material is formed into a bag which is placed over the object be protected. The bag is then shrunk around the object with the non-woven fabric engaging the surface of the object and supporting the film off of the surface of the object.

SUMMARY OF THE INVENTION

The present invention relates to an improved material and method for its manufacture. An adhesive is applied to the raised portions of a contoured gravure roll. The roll is rotated across the film, and hot melt adhesive is applied to the film in a pre-determined pattern. The adhesive generally covers from about 8.0 to about 33.0% of the film. The non-woven fabric is then adhered to the film by bringing the film and the fabric into physical contact. When the film is shrunk, the non-woven fabric separates from the film in the areas between the bonds to provide raised portions, thereby protecting the surface of the article from contact with the bonded portion of the non-woven fabric.

Often, it is desirable to prevent contact between the bonded portions of the non-woven fabric and the surface because the cured adhesive occurring along the bonded portion of the fabric is abrasive, as is the film, and any contact by either the film or the adhesive with the surface can cause damage. By protecting the surface of the object from the adhesive bonds, damage caused by rubbing of the bonded portion of the non-woven fabric across the surface being protected, which occurs for example during handling of the object during transport storage, is prevented. The repeating nature of the pattern of adhesive also facilitates manufacture and strengthens and adds tear resistance to the material.

BRIEF DESCRIPTION OF THE DRAWINGS

These and other advantages of the present invention will become apparent from the following description, with reference to the accompanying drawings, in which:

FIG. 1 is schematic illustration of the manner in which the material of the present invention is manufactured;

FIG. 2 is a plan view of the gravure roll used to apply the adhesive to the film in the manufacture of the material according to the present invention;

FIG. 3 is a fragmentary view in perspective of the material made using the gravure roll illustrated in FIG. 2 with the film layer peeled away from the non-woven fabric;

FIG. 4 is a fragmentary view in perspective of the material illustrated in FIG. 3 after the material has been shrunk;

FIG. 5 is a view similar to FIG. 2, but illustrating another embodiment of the gravure roll used to apply adhesive to the film;

FIG. 6 is an enlarged view of the circumscribed portion of FIG. 5;

FIG. 7 is a view similar to FIG. 4, but illustrating the material made using the gravure roll illustrated in FIG. 5;

FIG. 8 is an enlarged cross-sectional view of the material illustrated in FIG. 4, but with the material displaced from the surface protected by the material; and FIG. 9 is a view similar to FIG. 8, but with the non-woven fabric of the present material engaged with the surface being protected.

DETAILED DESCRIPTION OF THE PREFERRED EMBODIMENTS

Referring now to FIGS. 14 of the drawings, a shrinkable, protective material made according to the present invention is generally indicated by the numeral 10. Protective material 10 includes a layer 12 of a shrinkable, stretchable film such as available from Wright Plastics Corporation, Prattville, Ala. and sold as film TS-5, or a film sold as film C-40 by Crayex Corporation, Piqua, Ohio, and a layer 14 of a non-woven fabric, preferably a hydro-entangled non-woven fabric such as Sontara available from DuPont Inc. The non-woven fabric can be made out of fibers such as polyester, nylon 6,6, or a combination of wood pulp and staple polyester fibers. The film and non-woven fabric are secured to one another by an adhesive which is placed on the film as will hereinafter be described in a predetermined pattern generally indicated by the numeral 16 (FIG. 3). Accordingly, areas 18 are defined on the film that are free of the adhesive between the areas covered by the adhesive pattern 14. The adhesive may be any commonly available, pressure sensitive, hot melt adhesive, preferably an adhesive in the "block copolymer" family, such as an S-I-S (styrene-isoprene-styrene), S-E-S (styrene-ethylene-styrene) or similar adhesive. Such adhesives are available from ATO Corp. of Findley, Ohio and H B. Fuller Corp. of Minneapolis, Minn. During manufacture, the non-woven fabric and film are lightly pressed against one another to cause the adhesive to bond the film and non-woven fabric together. As a result of the patterning of the adhesive, the adhesive generally need only cover between about 8.0 to about 33.0% of the film. In other words, the non-woven fabric overlays the film without being bonded to over about 67.0% of the area of the film. Accordingly, the bonded areas 20 of the material are much smaller than the unbonded areas 22.

Referring now to FIG. 1, the manner in which the material 10 is manufactured will now be described. A roll 24 of the film 12 is provided, and the film 12 is fed off of the roll 24 and is carried into engagement with the outer circumferential surface 26 of a rotating contoured gravure roll generally indicated by the numeral 28. The gravure roll 28 is available from Karl Wenk GmbH, Lorrach Brombach, Germany. The film is held against the outer surface 26 of the gravure roll 28 by idler rollers 30,32. As will be described hereinafter, the gravure roll applies adhesive to the film in the pre-determined pattern 16. The film 12, with the adhesive applied thereto, is then fed through a set of rollers 34, through which the non-woven fabric 14 is also fed after being pulled from a roll 36 so that the film 12 and non-woven fabric 14 are brought into substantially parallel alignment with one another. The film and non-woven are then carded through a conventional bonding station 38. The bonding station 38 is adjusted to provide light pressure to the film 12 and non-woven fabric 14 to cause the film and non-woven fabric to be bonded only in those areas in which adhesive has been applied to the film. The material 10 is wound on a take up roll 40. The bonding station 38 and the supports for the various rolls of material are a part of a conventional laminating machine available from Cavitec AG, Munchwilen, Switzerland.

According to a first embodiment, the outer circumferential surface 26 of the gravure roll 28 is provided with a first set of substantially parallel grooves 42 and a second set of substantially parallel grooves 44 which extend obliquely, i.e., perpendicularly with respect to the first set of grooves to define diamond-shaped areas 46 on the surface 26, so that the grooves 42, 44 define lower portions of the surface 26 and the areas 46 define raised portions relative to the grooves, but the areas 46 actually define the outer circumferential surface 26. The adhesive is maintained in molten form in a conventional adhesive dispenser generally indicated at 48.

Dispenser 48 includes a receptacle 50 in which the adhesive is maintained in the molten state and a roller 52 that extends parallel to the outer circumferential surface 26 and applies adhesive from the receptacle 50 on the entire surface 26, including both the grooves 42,44 and the areas 46. The adhesive is sufficiently liquid that it readily fills the grooves 42, 44. The roll 26, after the adhesive is applied to the outer circumferential surface 28, is rotated past a conventional doctor blade 54 that scrapes the adhesive off of the areas 46, thereby leaving adhesive only in the grooves 42, 44, so that adhesive is deposited on the film 12 in a substantially diamond shaped pattern 16. Other linear and non-linear, generally parallel adhesive patterns such as a hexagonal pattern, while not specifically illustrated, are contemplated and should theoretically give rise to the so-called pillows described in greater detail below.

As illustrated in FIG. 3, before the material 10 is shrunk by applying heat thereto in a manner well known to those skilled in the art, the non-woven fabric 14 is bonded to the film 12 in the areas where adhesive has been applied to the film as defined by the pattern 16. The portions of the non-woven fabric 14 which are not bonded to the film 12 overlay and engage the areas 18 of the film which are free of adhesive. However, after the material 10 is shrunk, as indicated in FIG. 4, since the film 12 shrinks and the non-woven fabric 14 does not shrink in any appreciable amount, the portions of the non-woven fabric 14 overlying the areas 18 which are unbonded gathers up to form soft, curved raised portions or pillows 56, which act as shock absorbers and have no square corners that might cut or abrade. These pillows 56 engage the surface of the article being protected (not shown in FIG. 4), thus forming a cushion supporting the film off of the surface of the article being protected. This is more clearly illustrated in FIGS. 8 and 9, in which the surface of the article being protected is indicated by the numeral 58. In FIG. 8, in which the material 10 is illustrated as being displaced from the surface 58, even though the material 10 has been shrunk, the pillows 56 define edge portions 60 which face one another and define the portions of the non-woven fabric that are secured to the film 12 via the bonds 20. However, when the material 10 is used to protect the surface 58, the non-woven fabric engages the surface and the edge portions 60 of the film are deflected by contact of the pillows 56 with the surface 58 such that the portions 60 cover the bonds 20, thus preventing contact between the bonds 20 and the surface 58. The bonds 20 tend to be more abrasive than the film itself and as such, it is important that the bonds 20 are precluded from coming into contact with the surface 58. Accordingly, the deflectable edge portions 60 prevent such contact, assuring that the surface 58 will be protected from the abrasive bonds 20. The cushioning effect of the non-woven fabric also protects the surface 58 against damage by small hurled objects, such as stones, that may occur during transport. Because the non-woven fabric and film are secured to each other at regular intervals, the material is essentially not capable of being stretched around curves or corners of the object 58 in such a manner that the non-woven will be drawn down to the extent that the film comes in direct contact with the object 58.

The pillows 56 generally have an increasing average height dimension (from base to pinnacle prior to being applied over a surface) as the shrink rate of the film in both the machine and cross-machine directions increase. For example and without limitation, for a material having a shrink stretch film with an average thickness of about 5 mils and a non-woven fabric layer having an average thickness of about 14 mils, the average pillow height will increase to approximately 140 mils at a 10% shrink rate. At a 20% shrink rate, the average pillow height is approximately 210 mils and at a 35% shrink rate, the average pillow height is approximately 380 mils. Thus, for each 10% increase in the shrink rate, the pillow height increases at least about two times (2×) prior to application over a surface. By the phrase "shrink rate", it is meant the amount of shrinkage occurring, not the speed at which shrinkage occurs.

While a substantially diamond shaped pattern has been discussed above as a preferred pattern, it should be understood that the invention is not limited to any particular pattern 16 of applying adhesive to the film 12. For example, and referring to the alternate embodiment of FIGS. 5–7, the outer circumferential surface 26 of the gravure roll may be provided with a single set of parallel grooves 62 that extend circumferentially around the roller 26. Accordingly a pattern of adhesive is deposited on the film 12 consisting of parallel lines. Referring to FIG. 7, the bonds 64 between the film 12 and non-woven 14 are also elongated strips and the pillows 56 formed after shrinking extend the entire length of the material. As discussed above, one advantage of applying the adhesive in a distinct pattern is that the tear strength of the film is increased. Because the embodiment of FIGS. 5–7 does not have the crossing lines of adhesive as does the embodiment of FIGS. 2–4, the tear strength will be less, but less adhesive will also be used and because the non-woven fabric is less restrained by the bonds, the non-woven will more readily gather up and deflect.

While it will be apparent that the preferred embodiments of the invention disclosed are well calculated to fulfill the objects stated, it will be appreciated that the invention is susceptible to modification, variation and change without departing from the spirit thereof.

Further, most applications of the material will require that the layer 12 of a shrinkable, stretchable film beyond bonded to substantially the entire area of non-woven fabric, it is fully contemplated area specific bonding embodiments are well within the scope of the present invention.

What is claimed is:

1. Shrink wrap material for protecting an object from surface damage comprising a heat shrinkable film layer having a pre-determined shrink response when heat is applied thereto, an adhesive applied to said film in a predetermined pattern defining first areas of the film bearing said adhesive and second areas being void of said adhesive, and a non-woven fabric layer for engaging said object when the material is applied to said object, said non-woven layer being intermittently bonded to said film by said adhesive, whereby upon shrinking said film, said non-woven fabric gathers up in the areas void of adhesive to form pillows that overlie the first areas of the film including the adhesive, thus maintaining the bonded portions of the fabric and heat shrinkable film away from the object, thereby protecting said object from surface damage which may be caused by said bonded portions.

2. Shrink wrap material as claimed in claim 1, wherein said predetermined pattern defining said first area includes parallel lines.

3. Shrink wrap material as claimed in claim 1, wherein said predetermined pattern of adhesive defining said first areas include a first set of parallel lines and a second set of parallel lines crossing said first set of parallel lines.

4. Shrink wrap material as claimed in claim 3, wherein said patterned adhesive is substantially diamond shaped.

5. Shrink wrap material as claimed in claim 1, wherein said adhesive covers between about 8.0 to about 33.0% of said film.

6. Shrink wrap material for protecting an object comprising a heat shrinkable film outer layer having a predetermined shrink response when heat is applied thereto, a non-woven fabric inner layer for engaging said object when said material is shrunk around said object, and a patterned adhesive disposed between said film outer layer and said non-woven fabric inner layer thereby coupling said film outer layer to said non-woven fabric inner layer to form bonded areas and unbonded areas whereby, upon the application of heat to said material, the non-woven fabric occurring along said unbonded areas gather up to overlie the adhesive occurring along said bonded areas thereby maintaining the bonded areas away from the object, thus protecting the object from potential surface damage caused by the bonded areas.

7. Shrink wrap material as claimed in claim 6, wherein said patterned adhesive includes substantially parallel lines.

8. Shrink wrap material as claimed in claim 6, wherein said patterned adhesive includes a first set of substantially parallel lines and a second set of perpendicular to said set of parallel lines.

9. Shrink wrap material as claimed in claim 8 wherein said patterned adhesive is substantially diamond shaped.

10. Shrink wrap material as claimed in claim 6, wherein said unbonded overlying portions of non-woven fabric include pillows having portions which extend over said bonded portions.

11. Shrink wrap material as claimed in claim 6 wherein said pillows have an increasing average height dimension from base to pinnacle prior to application over a surface as the shrink rate of said film increases.

12. Shrink wrap material as claimed in claim 11 wherein said average height dimension of said pillows increases by a factor of at least about two times for each 10% increase in the shrink rate of said film.

13. Shrink wrap material as claimed in claim 6, wherein said adhesive covers between 8.0 to about 33.0% of said film.

* * * * *